United States Patent [19]

Hamlin

[11] Patent Number: 5,728,298
[45] Date of Patent: Mar. 17, 1998

[54] FILTER ELEMENT AND METHOD FOR THE MANUFACTURE THEREOF

[75] Inventor: Thomas Hamlin, Vernon, Conn.

[73] Assignee: Cuno, Incorporated, Meriden, Conn.

[21] Appl. No.: 968,281

[22] Filed: Oct. 29, 1992

[51] Int. Cl.$^6$ .................................................. B01D 39/16
[52] U.S. Cl. .................. 210/491; 210/497.01; 210/505; 210/508; 55/524; 55/527; 55/529; 156/187; 156/190; 264/165; 428/36.1
[58] Field of Search .................................... 210/483, 486, 210/487, 488, 489, 490, 491, 497.01, 505, 508; 55/DIG. 5, 529, 527, 524, 486, 487; 156/187, 190; 264/165; 162/219; 427/180, 295; 428/36.1

[56] References Cited

U.S. PATENT DOCUMENTS

| | | |
|---|---|---|
| 2,539,767 | 5/1951 | Anderson . |
| 2,539,768 | 5/1951 | Anderson . |
| 3,061,107 | 10/1962 | Taylor .................................. 210/487 |
| 3,347,391 | 10/1967 | Steensen ............................. 210/491 |
| 3,442,392 | 5/1969 | Shelley ................................ 210/491 |
| 3,442,757 | 5/1969 | Williams . |
| 3,585,107 | 6/1971 | Williams . |
| 3,592,769 | 7/1971 | Decker ................................. 210/491 |
| 3,594,273 | 7/1971 | Williams . |
| 3,619,353 | 11/1971 | Williams . |
| 3,995,076 | 11/1976 | Sicard . |
| 4,102,785 | 7/1978 | Head et al. ........................ 210/487 |
| 4,111,815 | 9/1978 | Walker et al. ..................... 210/487 |
| 4,983,288 | 1/1991 | Karbachsch et al. ............. 210/490 |
| 5,015,316 | 5/1991 | Ostreicher et al. . |
| 5,028,327 | 7/1991 | Ostreicher et al. . |

*Primary Examiner*—W. L. Walker
*Attorney, Agent, or Firm*—Renner, Kenner, Greive, Bobak, Taylor & Weber

[57] ABSTRACT

A filter element (10) comprises a porous, thick-walled, integral, self-supporting, resin impregnated and bonded fibrous, tubular filter structure (11) having a hollow core (15); an inner shell (20) of a first large pore size porous media adjacent the hollow core and forming the majority of the filter structure; and an outer shell (21) of a second small pore size porous media, finer than the first porous media and adjacent the inner shell, the first and second porous media being resin impregnated and bonded. A method for the manufacture of a porous, thick-walled, integral, self-supporting, resin impregnated fibrous tubular filter element comprises the steps of forming a hollow inner shell of a first large pore size porous media; forming an outer shell of a second small pore size porous media, onto the inner shell, finer than the first porous media; impregnating the inner shell and the outer shell with a resin binder; and curing the resin to form an integral, self-supporting, resin impregnated and bonded fibrous, tubular filter element.

25 Claims, 2 Drawing Sheets

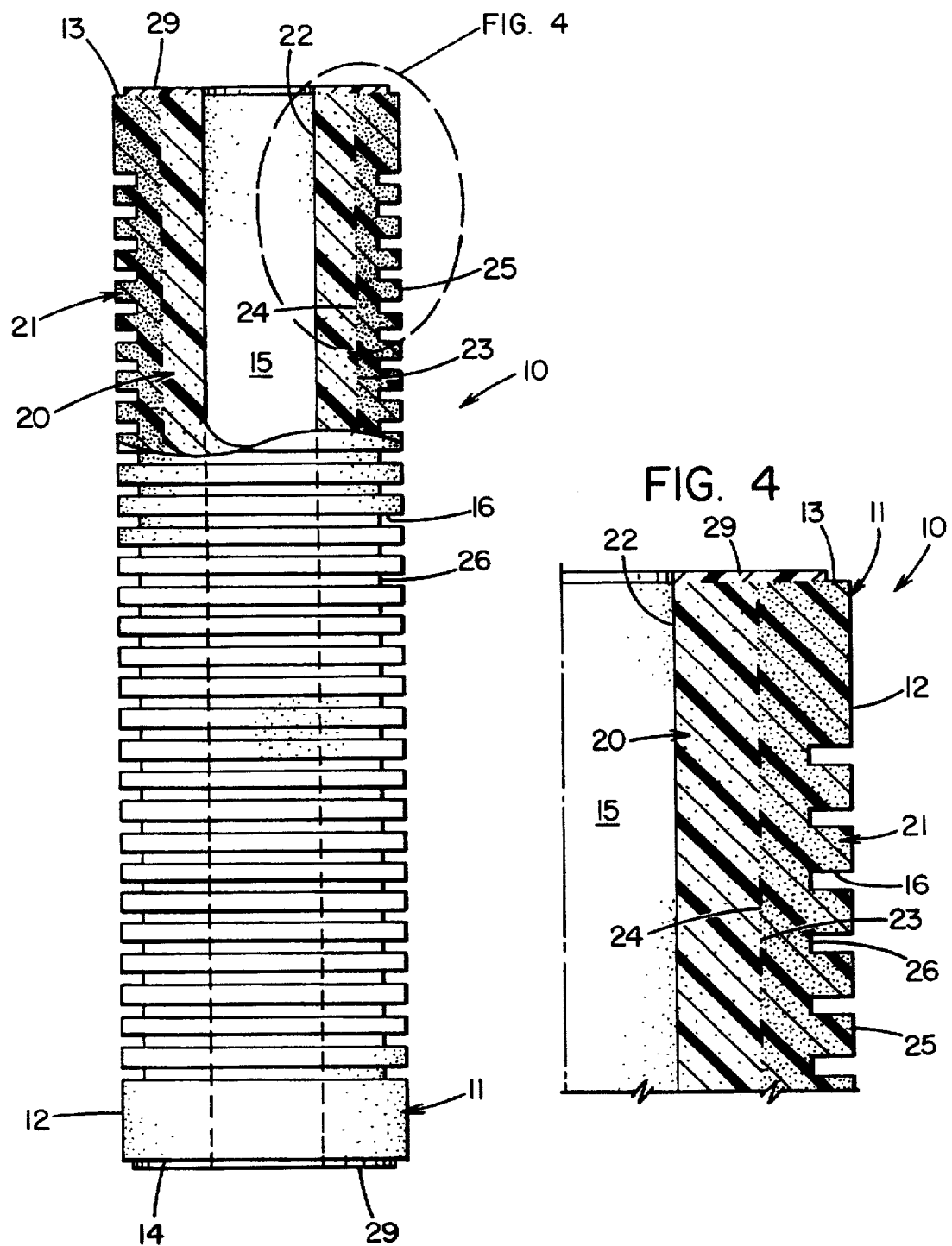

FILTER ELEMENT AND METHOD FOR THE MANUFACTURE THEREOF

TECHNICAL FIELD

The present invention relates to filter elements and a method for their manufacture. More particularly, a filter element is provided comprising resin impregnated and bonded fibrous materials and having a higher efficiency than known filter elements comprising resin impregnated and bonded fibrous material.

BACKGROUND ART

Filter elements which are self-supporting resin impregnated and bonded fiber structures are well known in the art. Preferred embodiments of such filters are described in U.S. Pat. Nos. 2,539,767 and 2,539,768 to Anderson are produced and sold by the Assignee herein under the trademark MICRO-KLEAN® (Cuno, Incorporated, Meriden, Conn.) wherein the bonding systems are water soluble thermosetting resins. Broadly, these filter elements are relatively rigid, self-supporting, porous thick-walled, tubular members composed entirely of a resin impregnated and bonded fibrous material. The filter elements are used for filtering liquids and gases by flowing radially inwardly under a differential pressure.

Typically the filter elements are designed to obtain maximum contaminant capacity consistent with their filtration efficiency by providing a fibrous structure of a graded porosity, with the size of the pores progressively increasing rapidly outwardly toward the outer surface. By virtue of such graded porosity, or density, as the fluid flows inwardly through progressively smaller pores, the particulate contaminant to be filtered out penetrates to varying depths according to its size. Thus, the filter elements can accommodate more solids without effecting flow, with a consequently longer, effective life before the elements need replacing.

For example, in Anderson, the graded porosity in the filter elements is accomplished by vacuum accreting resin-impregnated fibers from an aqueous uniform dispersion of such fibers under controlled conditions as to the amount of vacuum used in effecting such accretion and as to the composition and characteristics of the fibrous stock used.

This approach to producing rigid, self-supporting, porous, thick-walled tubular filter elements has been usefully employed for over 40 years. It has, however, presented distinct limitations to the development and production of higher efficiency filter elements capable of removing ever-smaller contaminant particles. As is well known to the art, achieving such high filtration efficiencies requires the use of very small diameter fibers such as glass microfibers. Aqueous dispersions containing significant amounts of such fine fibers exhibit very slow formation rates during the required vacuum accretion. In many cases, it has proven impossible to form, by vacuum accretion, the required thick-walled tubular filter elements from such fine fiber dispersions. Similarly, it has proven difficult, if not impossible, to impregnate, dry, and cure such filter elements because of the high resistance to liquid or gas flow. Using the current state-of-the-art MICRO-KLEAN® process, the highest efficiency cartridge that can be produced is practically limited to an 8 micrometer nominal (90 percent particle removal efficiency) rating. There are other approaches to producing high efficiency filter cartridges but all involve the use of expensive raw materials and/or processes. Accordingly, there is a well-defined industrial need for low-cost, economical rigid, self-supporting resin impregnated and bonded filter elements with nominal filtration ratings of less than 8 micrometers, that the prior art has not been able to satisfy.

DISCLOSURE OF THE INVENTION

It is therefore an object of the present invention to provide a filter dement, comprising resin bonded fibers, having a higher efficiency than existing filter elements of this type.

It is another object of the present invention to provide a higher efficiency filter element comprising an inner shell of a first porous media and an outer shell of a second porous media, more fine than the first porous media.

It is yet another object of the present invention to provide a method for the manufacture of a higher efficiency filter element comprising two layers of resin impregnated and bonded fiber materials.

At least one or more of the foregoing objects, together with the advantages thereof over known methods which shall become apparent from the specification which follows, are accomplished by the invention as hereinafter described and claimed.

In general, the present invention provides a filter element comprising a porous, thick-walled, integral, self-supporting, fibrous, tubular filter structure having a hollow core; an inner shell of a first large pore size porous media adjacent the hollow core and forming a significant portion of the filter structure; and an outer shell of a second small pore size porous media, finer than the first porous media and adjacent the inner shell, the first and second porous media being resin impregnated and bonded.

The present invention also provides a method for the manufacture of a porous, thick-walled, integral, self-supporting, fibrous, tubular filter element comprising the steps of forming a hollow inner shell of a first large pore size porous media; forming an outer shell of a second small pore size porous media, onto the inner large pore size shell finer than the first porous media; impregnating the inner shell and the outer shell with a water soluble thermosetting resin binder; and curing the resin to form an integral, self-supporting, fibrous, tubular filter element.

BRIEF DESCRIPTION OF THE DRAWINGS

FIG. 3 is a longitudinal section, taken substantially along line 3—3 of FIG. 1; and FIG. 4 is an enlarged fragmentary view of the area circled in FIG. 4.

PREFERRED EMBODIMENT FOR CARRYING OUT THE INVENTION

Apart from the novelty of the filter elements taught by the present invention, filter elements of this type are well known in the art as is their method of manufacture. As previously indicated these are produced, for example, as described in Assignee's U.S. Pat. Nos. 2,539,767 and 2,539,768 to Anderson, the entire disclosures of which are incorporated herein by reference. In the current MICRO-KLEAN® production process, the Anderson process has been modified so that the fibers are vacuum accreted from a uniform aqueous dispersion and then, subsequently, vacuum impregnated with a water soluble thermosetting resin. Accordingly, the filter elements of the present invention generally comprise a relatively rigid self-supporting, porous, thick-walled, tubular member composed entirely of resin-impregnated and bonded fibrous materials.

Typically, filter elements of this type are sealingly arrayed within a filter housing which allows for the ingress of a fluid, liquid or gas, to be filtered and the egress of a filtrate. Within the housing or cartridge, means are provided to direct the fluid to the radially outermost surfaces of the element where the fluid then flows radially inwardly under pressure and is filtered, to exit axially via a central hollow core. It is to be understood that the environment for such use is well known and does not constitute novelty of the present invention. Accordingly, such housings and the passage of the fluid have not been depicted.

In similar fashion, to provide tighter, more efficient filter elements of this type, it has become necessary to seal the ends of the filter elements in order to prevent the by-pass of the filter by the unfiltered fluid or contamination by the filtered particles. One particularly useful means of effecting such sealing is to employ a gasket at each end comprising a polyethylene closed cell foam. Such foams are well known in the art, a preferred brand being sold by Volteck of Lawrence, Mass. under the registered trademarks VOLARA and MINICEC, the former being preferred. The use of such gaskets for sealing filter elements of this type is described in U.S. Pat. Nos. 5,015,316 and 5,028,327 owned by the Assignee of record, the subject matter of which is incorporated herein by reference.

Figure 1:
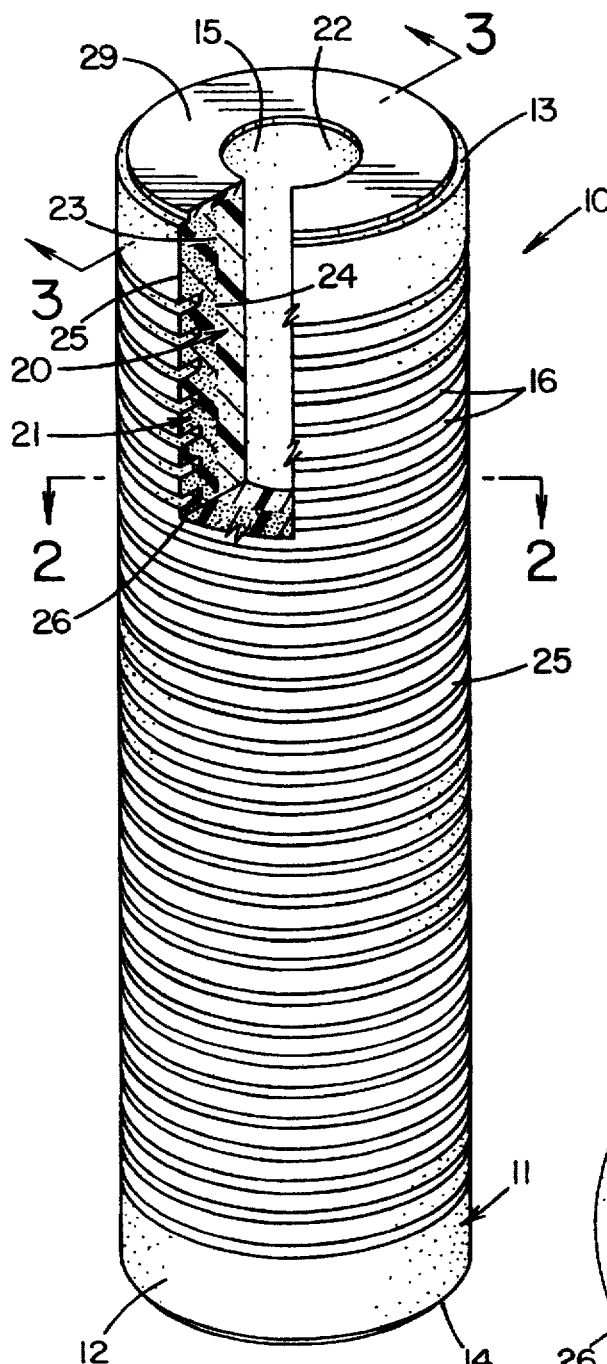
FIG. 1 is a perspective view of the filter element of the present invention, with a portion partially broken away.
Figure 2:
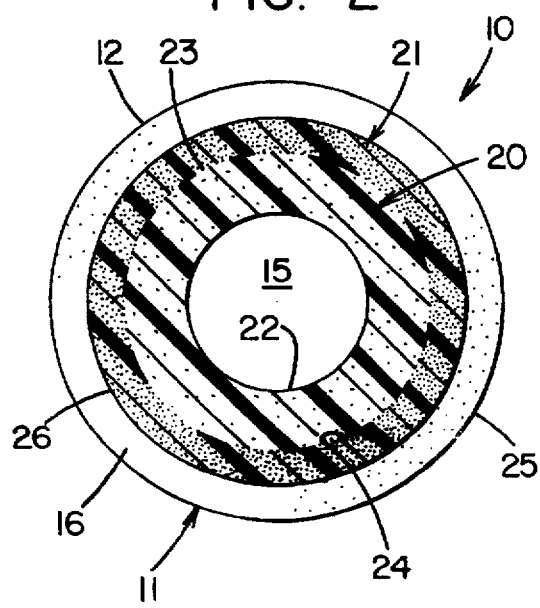
FIG. 2 is a cross section, taken substantially along line 2—2 of FIG. 1.

With reference to the drawings, the filter element of the present invention is depicted in FIG. 1, indicated generally by the numeral 10. The filter element 10 preferably comprises a cylindrical structure or body 11 having an outer surface 12, opposed ends 13 and 14 and a hollow axial core 15. The outer surface 12 may provide grooves 16, to provide increased surface area and contaminant capacity.

The element 10 is intended to be used for filtering liquids and gases which are caused to flow radially inwardly under a differential pressure. Heretofore, in order to obtain the maximum life consistent with the filtering efficiency, the fibrous structure of the filter element 10 has comprised a graded porosity, with the size of the pores progressively increasing radially outwardly toward the outer surface 12. By virtue of such graded porosity, or density, as the fluid flowed inwardly through progressively smaller pores, the particulate contaminants to be filtered penetrated to varying depths according to their size.

The filter element 10 of the present invention employs an incrementally graded porosity; however, in contradiction to prior art the porosity gradation has been reversed, that is, the pores are most numerous and their sizes the smallest at the outer surface 12 of the body 11. More particularly, the body 11 actually comprises two components, an inner shell 20 of generally large pore size and an outer shell 21 of small pore size. The inner shell 20 is bounded at its inner diameter or wall 22 by the hollow axial core 15 and an outer diameter or wall 23, forming a thickness which comprises approximately 30 to about 70 percent of the overall element thickness. Similarly, the inner diameter or wall 24 of the outer shell 21 is continuous with the outer diameter wall 23 of inner shell 20 while the radially outer wall 25 is continuous with the outer surface 12. As depicted in the drawings, particularly FIG. 4, the outer surface 12 may provide grooves 16, which are individual annular rings. The bottom 26 of each groove or ring 16 is located within the outer shell 21. Alternatively, for other embodiments within the scope of the present invention, the outer surface 12 can be free of grooves 16.

In order to manufacture the filter element 10 according to the present invention, a fibrous material is mixed with water or other suitable dispersant to form a slurry. Subsequently, one or more perforate formers or dies are immersed in the slurry in a felting tank holding the aqueous dispersion of fibers and the fibers are caused to be accreted upon the formers by application of a vacuum suction imposed upon the interior of the formers. By the control of the degree of vacuum and the length of time over which the vacuum is applied, in conjunction with the proper selection and control of the characteristics of the fiber, a filter carcass is produced of the depth, or thickness and porosity that is desired.

This procedure is terminated when an adequate volume of fibers have been accreted to form the inner shell 20. After formation thereof, a substantial portion of the water or dispersing agent is removed by drawing hot air through the former and inner shell 20. The former is then immersed in a second aqueous dispersion of fiber media selected to form the tighter, smaller pore size of the outer shell 21. This step of overfelting the inner shell 20, is controlled by the degree of vacuum and continued for a duration of time adequate to produce an outer shell having the intended thickness. After formation of the shell 21, a substantial portion of the water or dispersing aid is again removed by drawing hot air through the former, inner shell 20 and outer shell 21.

In order to impart to the filter element strength and rigidity, as well as to waterproof the fibers so that they will not become soggy, or soft in the presence of water or other fluids, a resin is used to impregnate the fibers and to bond them together in a relatively fixed relationship. The amounts of resin used may vary between 30 percent and 60 percent by total weight of the filter element. Various resins including thermosetting resins such as phenol formaldehyde condensation products, urea formaldehyde condensations products, and the melamine resins may be used. Thermoplastic resins may also be employed, such as polystyrene. Preferred resins are melamine and phenolic resins.

Resin impregnation is conducted by immersing the dried composite of inner shell 20 and outer shell 21 in a tank of resin and applying a vacuum through the former for a sufficient period of time for all of the fibers to be contacted. Generally, about 10 minutes will suffice but, of course, time is a function of the vacuum as well as the size and density of the filter element and hence, the method of the present invention should not be limited thereby.

After impregnation, the filter element is cured by heat under temperature and time conditions appropriate for the curing of the particular resin used. In the final step, the filter cartridge is sized to accurate dimensions by cutting or trimming mechanically as by means of a knife, saw or grinder (see the U.S. Pat. No. 2,539,767 to Anderson)

The fibers employed to manufacture the inner shell 20 can comprise acrylic, nylon, polyester, cellulose and mixtures thereof. These fibers have average diameters ranging from about 10 to 40 micrometers and provide a pore size ranging from about 5 to about 50 micrometers, with 10 to 20 micrometers being preferred.

The fibers employed in the overfelting step to form the outer shell 21 are selected to provide a very tight, small pore size second porous media. As such, the fibers can comprise acrylic, nylon, polyester, cellulose and mixtures thereof to which a relatively high percentage of glass microfibers have been added. Amounts of the latter range from about 5 to about 30 weight percent. Average glass microfiber diameters can be selected ranging from about 0.5 mm to 5 mm.

Because of the unique structure of the filter element made according to the present invention, it is now possible to remove substantially finer particles than via the use of a conventional fibrous filter element. A comparison is presented in Table I hereinbelow between a MICRO-KLEAN® filter element, characterizing the known art, and a filter element according to the present invention.

TABLE I

PARTICLE SIZE FOR INDICATED INITIAL PARTICLE REMOVAL EFFICIENCY

|  | 50% | 90% | 95% | 98% | 99% |
|---|---|---|---|---|---|
| Prior Art[a] (micrometers) | 4.6 | 7.9 | 8.9 | 9.9 | 11.6 |
| High Efficiency[b] (micrometers) | (c) | 3.1 | 3.4 | 3.8 | 4.3 |

[a]tighest prior art MICRO-KLEAN ® efficiency
[b]tighest efficiency for filter element according to the present invention
(c) could not be measured By reviewing the data presented in Table I, it should now be appreciated that the relatively open inner shell formed by the first porous media and overfelted outer shell of the second porous media, being much finer than the first porous media, results in a unique filter element which can filter much finer particles with high efficiency.

For use in high efficiency filter applications, it is necessary that the filter element 10 employ an extremely effective sealing means. Referring to FIGS. 1 and 3, thermally bonded to each end 13 and 14 of element 10 is a thermoplastic polymer closed cell foamed sealing gasket 29. Each gasket 29 provides an effective sealing surface between the ends of the cartridge 10 and the sealing edge of the filter housing (not shown).

The gaskets are typically in the form of a donut shaped disc circle which is adhered to the filter ends 13, 14 concentrically with the hollow axial core 15. Typically the gasket may be of a diameter somewhat smaller than the outside diameter of the filter element 10, and have an inside diameter somewhat larger than the internal diameter of the filter element. Typically the discs are 1/16 to 3/32 of an inch thick. This dimension could be increased if necessary to compensate for troublesome sealing configurations that require more resiliency or depth to provide sufficient sealing. The foam is obtained in sheet form and cut into discs of the desired size and shape.

The gaskets 29 are applied to the filter element 10 by heating the ends 13, 14 of the element 10 to a temperature sufficiently high to thermally melt bond the gaskets 29 to the cartridge end when the gasket is contacted with the hard filter element surface. Such temperature may be determined readily and is empirically derived but is below the temperature at which the element starts to deteriorate, melt and/or fuse and is also below a temperature that completely melts the gasket. However, it has been found that the cells inside the gasketing material insulate the heated lower surface in contact with the heated ends of the filter 10 from the remaining portion of the gasketing material and thus, only the lower surface of the gasket is sufficiently heated to melt bond itself to the ends of the filter element 10. Such heating can be accomplished with a hot plate, infrared energy, hot air, etc. A number of techniques are available for heating the end of the element which are simple to accomplish and to automate.

The closed cell configuration of the polymer is also desirable because it provides resiliency or spring back that allows compensation for out of alignment or out of flatness of the end of the cartridge. Additionally, the closed cell configuration provides sealing between cells through which the fluid cannot seep or flow. The use of a solid polymeric gasket would be inadequate because although it might bond to the filter element by the mere heating of the end of the cartridge, it would either completely melt and deform and/or would not provide sufficient resiliency for the sealing edges of the filter housing to embed therein. For a more complete description of these sealing gaskets, reference can be made to U.S. Pat. Nos. 5,015,316 and 5,028,327, noted hereinabove.

The filter housings used in conjunction with the filter element of this invention are well known in the art. The cartridges may be used in varying lengths or multiples of a single length, stacked one on top of another. In such arrangements all the cartridges in multiple height stack arrangements are thermally bonded with a hot melt polymer, e.g., polypropylene, to assure alignment and permanent bonding for positive sealing against bypass.

The filter elements may be used for removing particulate contaminants which are fibrous, abrasive or gelatinous from fluids such as gas, alcohol, glycols, coolants, fuels, oils, lubricants, cosmetics, paints and varnishes, syrups, compressed air, water or sensitive process liquids, e.g., demineralized water, food products, beverages, photographic solutions and, particularly, magnetic oxide slurries for producing magnetic recording media.

Based upon the foregoing disclosure, it should now be apparent that the filter element of the present invention will carry out the objects set forth hereinabove. It should also be apparent to those skilled in the art that the method of the present invention can be practiced to manufacture a high efficiency filter element having an outer shell of smaller pore size porous media than that of the inner shell. Similarly, the selection of fibers and bonding resins which may be employed to prepare the filter element can readily be determined by those skilled in the art, depending upon the filtration desired.

It is, therefore, to be understood that any variations evident fall within the scope of the claimed invention and thus, the overall structure and size of the filter element, as well as the pore size can be varied to suit the ultimate application and can be determined without departing from the spirit of the invention herein disclosed and described. Moreover, the scope of the invention shall include all modifications and variations that may fall within the scope of the attached claims.

What is claimed is:

1. A filter element for use in apparatus providing radially inward flow of a material that is to be filtered comprising:
   a porous, thick-walled, integral, self-supporting, resin impregnated and bonded fibrous, tubular filter structure having
   a hollow core;
   an inner shell of a first large pore size porous media adjacent said hollow core; and
   an outer shell of a second small pore size porous media, finer than said first porous media and adjacent said inner shell, said first and second porous media being resin impregnated and bonded, wherein the material to be filtered is directed first through said outer shell and secondly through said inner shell.

2. A filter element, as set forth in claim 1, wherein said first porous media comprises fibers selected from the group consisting of acrylic, nylon, polyester, cellulose and mixtures thereof.

3. A filter element, as set forth in claim 2, wherein said fibers have average diameters ranging from about 10 to 40 micrometers.

4. A filter element, as set forth in claim 3, wherein said first porous media provides pore sizes ranging from about ranging from about 5 to about 50 microns.

5. A filter element, as set forth in claim 1, wherein said second porous media comprises fibers selected from the group consisting of acrylic, nylon, polyester, cellulose and mixtures thereof with glass microfibers.

6. A filter dement, as set forth in claim 5, wherein said glass microfibers have an average diameter ranging from about 0.5 to about 5 micrometers.

7. A filter dement, as set forth in claim 6, wherein said glass microfibers comprises from about 5 to about 30 weight percent of said outer shell.

8. A filter element, as set forth in claim 1, wherein said inner shell comprises from about 30 to 70 percent of the diameter of said element.

9. A filter element, as set forth in claim 1, wherein said tubular filter structure provides an outer wall having a plurality of circumferential grooves.

10. A filter element, as set forth in claim 1, further having opposed ends carrying gaskets seals, thermally bonded thereto.

11. A method for the manufacture of a porous, thick-walled, integral, self-supporting, resin impregnated and bonded fibrous, tubular filter element for use in apparatus providing radially inward flow of a material that is to be filtered comprising the steps of:

forming a hollow inner shell of a first large pore size porous media;

forming an outer shell of a second small pore size porous media, onto said inner shell, finer than said first porous media;

impregnating said inner shell and said outer shell with a resin binder; and curing said resin to form an integral, self-supporting, resin impregnated and bonded fibrous, tubular filter element.

12. A method, as set forth in claim 11, wherein said step of forming said hollow inner shell employs fibers selected from the group consisting of acrylic, nylon, polyester, cellulose and mixtures thereof.

13. A method, as set forth in claim 12, wherein said fibers have average diameters ranging from about 10 to 40 micrometers.

14. A method, as set forth in claim 13, wherein said first porous media provides pore sizes ranging from about 5 to about 50 microns.

15. A method, as set forth in claim 11, wherein said step of forming said outer shell employs fibers selected from the group consisting of acrylic, nylon, polyester, cellulose and mixtures thereof with glass microfibers.

16. A method, as set forth in claim 15, wherein said glass microfibers have an average diameter ranging from about 0.5 to about 5 micrometers.

17. A method, as set forth in claim 16, wherein said glass microfibers comprises from about 5 to about 30 weight percent of said outer shell.

18. A method, as set forth in claim 11, wherein said inner shell comprises from about 30 to 70 percent of the diameter of said element.

19. A method, as set forth in claim 11, including the additional step of providing a plurality of circumferential grooves in said outer shell.

20. A method, as set forth in claim 11, including the additional step of thermally bonding gaskets seals to opposed ends of said filter elements.

21. A method for filtering fluid materials comprising the steps of:

providing a filter element comprising
a porous tubular filter structure having
a hollow core;
an inner shell of a first large pore size porous media adjacent said hollow core; and
an outer shell of a second small pore size porous media, finer than said first porous media and adjacent said inner shell, said first and second porous media being resin impregnated and bonded;

directing the material first through said outer shell and secondly through said inner shell; and removing the filtrate from said hollow core.

22. A method, as set forth in claim 21, wherein said first porous media provides pore sizes ranging from about ranging from about 5 to about 50 microns.

23. A method, as set forth in claim 21, wherein said first porous media comprises fibers selected from the group consisting of acrylic, nylon, polyester, cellulose and mixtures thereof.

24. A method, as set forth in claim 21, wherein said second porous media comprises fibers selected from the group consisting of acrylic, nylon, polyester, cellulose and mixtures thereof with glass microfibers.

25. A method, as set forth in claim 21, wherein said inner shell comprises from about 30 to 70 percent of the diameter of said element.

* * * * *

UNITED STATES PATENT AND TRADEMARK OFFICE
CERTIFICATE OF CORRECTION

PATENT NO. : 5,728,298
DATED : February 17, 1998
INVENTOR(S) : Thomas Hamlin

It is certified that error appears in the above-identified patent and that said Letters Patent is hereby corrected as shown below:

In Claim 4, Column 7, line 5, delete the first occurrence of -- ranging from about --.

In Claim 6, Column 7, line 11, after filter, delete "dement" and insert therefore -- element --

Claim 7, column 7, line 14, after filter, delete the word "dement" and insert therefore -- element --.

In Claim 22, Column 8, line 36, delete the first occurrence of -- ranging from about --.

Signed and Sealed this

Sixteenth Day of June, 1998

BRUCE LEHMAN

*Attest:*

*Attesting Officer*   *Commissioner of Patents and Trademarks*